Aug. 11, 1936.  C. HUNDERTMARK  2,050,951
TABLE FOR MOTOR VEHICLES
Filed Sept. 30, 1935
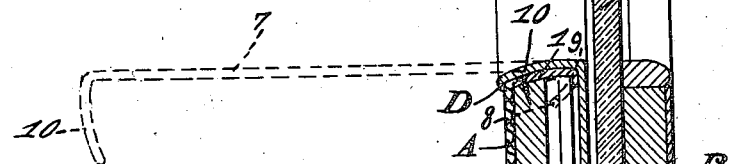
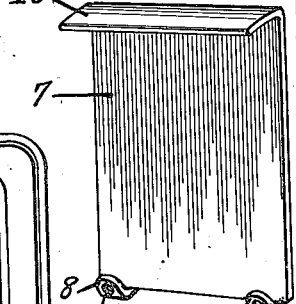
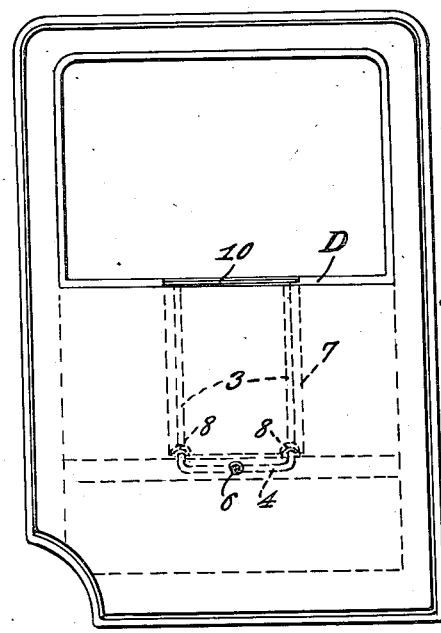
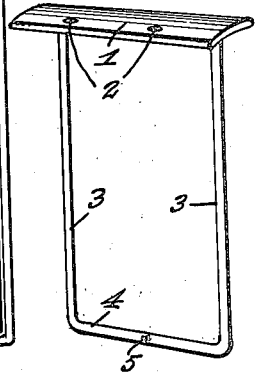
Conrad Hundertmark, INVENTOR
BY Victor J. Evans & Co.
ATTORNEY Patented Aug. 11, 1936

2,050,951

UNITED STATES PATENT OFFICE 2,050,951

TABLE FOR MOTOR VEHICLES

Conrad Hundertmark, Yemassee, S. C.

Application September 30, 1935, Serial No. 42,930

1 Claim. (Cl. 311—22)

This invention relates to tables, and its general object is to provide a table in the form of a tray to receive food, drinks and the like for the convenience of the passengers of a motor vehicle, in that it is associated with the doors and windows of the vehicle, to be carried and supported thereby, for disposal over the laps of the passengers when in use, with the glass of the doors and windows either opened or closed, and when not in use can be disposed between the panels of the doors or portions of the vehicle below the windows to be hidden from view.

A further object of the invention is to provide a table of the disappearing type that is slidably mounted in the doors and between panel portions of a vehicle, for disposal into and out of use, in an easy and expeditious manner, and is relatively fixed to support considerable weight when in operative position, and to prevent displacement and rattle when in either position.

Another object of the invention is to provide a disappearing table in the form of a tray, that is simple in construction, inexpensive to manufacture, easy to install, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a view illustrating my table installed on the door of a motor vehicle.

Figure 2 is an enlarged sectional view showing the table in position for use in dash lines, and in concealed position in full lines.

Figure 3 is a perspective view of the sliding tray member.

Figure 4 is a similar view of the supporting and guide means therefor.

While I have illustrated my table associated with a door of a motor vehicle, I want it understood that it can be associated with a window or the like or any other portion of a vehicle, without departing from the spirit of the invention.

The door includes the usual inner and outer panels A and B between which is mounted the glass C, and the inner panel includes the usual finishing strip D which in the form as shown is slotted or cut away to provide a recess to receive the body or plate strip of the supporting and carrying portion of my table. The strip 1 may be arranged flush with or below the finishing strip D and is provided with openings 2 for the passage of screws or the like for fixing the same to the frame of the door, as shown in Figure 2.

Secured to and depending from the strip for disposal between the panels of the door is the arms 3 of a substantially U-shaped member 4 that preferably has a threaded opening 5 centrally of its bight portion as shown in Figure 4, to receive a screw bolt 6, so that the tray supporting and carrying means is fixed with respect to the door to prevent displacement or rattle as will be apparent. The tray portion of my table device includes a tray section 7 which of course is flat and may be solid as shown, or slotted at appropriate places to accommodate bolts or the like of the door locking or window operating means that may be disposed between the panels in the path of the section.

Formed on or otherwise secured to the inner end of the tray section 7 are lugs 8 having openings 9 therein to receive the arms or rods 3 of the U-shaped member 4 for slidable movement thereon, as will be apparent upon inspection of Figure 2, and so that the tray portion will be guided. The outer end of the tray section has formed thereon a flange 10 that is preferably curved as shown, to follow the curvature of the finishing strip D, and in the event the plate strip 1 is disposed below the surface of the strip D, sufficient space may be provided in the recess of the strip D to allow the flange to be countersunk therein. The flange can be slightly wider than the strip D to extend inwardly beyond the same to provide sufficient finger engaging space. However, the flange is shown in Figure 2 as overlapping the strip D, with the plate strip 1 countersunk within the strip D.

From the above description and disclosure of the drawing, it will be obvious that I have provided a table of the disappearing type and which is primarily designed for use with motor vehicles, for the convenience of the passengers thereof, and when it is desired to use the tray portion, the flange is grasped for drawing the same from between the panels of the door to the dash line position of Figure 2, to be supported above the lap of a passenger, and of course the reverse action is necessary for disposing the tray portion to its concealed or full line position of Figure 2.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A table for use in a motor vehicle and comprising a plate strip to be secured to the lower portion of a window opening of the vehicle, a substantially U-shaped member including arms in the form of rods secured to and depending from the plate strip for disposal between the panels of the vehicle, a tray portion including a flat top, inclined lugs secured to one end of the flat top and mounted for slidable movement on the rods for disposal of the tray portion into and out of position for use, and a flange formed on the opposite end of the top and shaped to fit the lower portion of the window opening and arranged for disposal over the plate strip.

CONRAD HUNDERTMARK.